3,216,839
FREE LIGNIN SOLUTIONS AND METHOD OF
MAKING AND USING SAME
David Webster, North Charleston, S.C., assignor to West
Virginia Pulp and Paper Company, New York, N.Y.,
a corporation of Delaware
No Drawing. Filed Mar. 22, 1960, Ser. No. 16,659
3 Claims. (Cl. 106—123)

This invention relates to lignin and more especially to free acid lignin. This invention relates more especially to solutions of free acid lignin and to methods of making and using such solutions.

In obtaining free cellulose fiber from natural ligno-cellulose material, the ligno-cellulose material ordinarily is subjected to treatment whereby the lignin is solubilized sufficiently to permit the formation of an aqueous slurry from which the fibers may be separated. The dissolved lignin, which is in the neighborhood of 25% by weight of the natural ligno-cellulose, is contained in the solution from which the fibers are separated. Much of the lignin thus separated from the cellulose fibers is merely utilized for fuel by partial evaporation of the water content of the solution and spraying the resulting concentrate into a furnace wherein the lignin is burned and from which inorganic treating chemicals used in the pulping operation may be at least partially recovered. When it is desired to recover the lignin as such, this ordinarily is accomplished by precipitating the lignin from the solution that is separated from the cellulose fibers and then filtering and drying the precipitate. When the lignin is thus recovered from a pulping operation in dry condition, it generally is in the form of an amorphous brown powder.

This invention is concerned with the utilization of lignin which is or is chemically similar to that produced as a by-product of alkaline pulping using either the soda process wherein the pulping liquor contains sodium hydroxide or the sulphate process wherein the pulping liquor contains both sodium hydroxide and sodium sulphide. Such lignin is generally referred to in the art as "alkali lignin" and is to be distinguished from sulphite lignin, which is the by-product of pulping natural ligno-cellulose material with bisulphite and sulphur dioxide and which occurs in the form of ligno-sulphonic acid in the sulphite waste liquor and can be precipitated by means of alkaline earth salts for effecting its recovery in the form of salt. This invention more particularly is concerned with alkali lignin which has been recovered in the free acid form. During the pulping process, whereby the fibers are released from the natural ligno-cellulose, the lignin becomes dissolved in the pulping liquor as lignin sodium salt. The lignin is conventionally recovered from the pulping liquor by acid precipitation after the liquor has been separated from the cellulose fibers. The acid which usually is used to effect precipitation is sulphuric acid or carbonic acid, although any other acid may be used. The lignin can be recovered from the acid precipitation step either as free lignin or as lignin sodium salt, depending upon the specific conditions which are utilized. If the lignin is precipitated at a high pH of the order of about 9.5 to 10, the lignin is obtained in the sodium salt form. On the other hand, if the lignin is precipitated at a low pH of the order of about 2.0 to 5.0 or if the lignin precipitated at a higher pH is acid washed so as to substantially free the lignin of sodium, free lignin is obtained. The term "free lignin" is used herein and in the claims with reference to alkali lignin which is sufficiently free of sodium or other alkali metal salt as to be substantially water insoluble. Such free lignin likewise is to be distinguished from lignin salts of metals other than the alkali metals, which salts are insoluble both in water and in 1,4 dioxane whereas "free lignin" is soluble in 1,4 dioxane.

Free lignin which has been recovered in the form of a dry brown powder presents difficulties during handling and use because of its dustiness. In a typical lignin recovery operation from black liquor, the lignin which is initially precipitated ordinarily is put back into solution and reprecipitated with acid and the resulting free lignin is concentrated to form a cake containing about 40% to 60% of water. Conventionally this cake is dried by spray drying and typically the lignin particles may range in size from about 0.5 to 10 microns. While the particles may to some extent occur as aggregates, nevertheless the frangibility of the aggregates coupled with the smallness of the precipitated lignin particles results in a product having the objectionable characteristic of extreme dustiness. Because of its dustiness it is not practical, due to the high losses involved to ship free lignin in bulk, thus necessitating special packaging in bags or in fiber drums for shipment. The dustiness of dry free lignin as ordinarily produced likewise is objectionable under most circumstances encountered in use. Thus the dust is a nuisance to workmen. Moreover, many of the particles are so fine as to float long distances in the air and ultimately become deposited on the surfaces of articles that are in the course of manufacture with resultant discoloration.

Whereas lignin in its sodium salt form is readily soluble in water, free lignin is substantially completely insoluble in water. However, free lignin may be dissolved in a solution of a phenol aldehyde resin of the alkaline catalyzed type which is in the resole or A stage, such resins being referred to herein as "A stage resoles."

As is well known, when the resin is in the A stage resole form the phenol and aldehyde have reacted to produce the initial condensation product of the phenol and the aldehyde. The initial reaction to form the A stage resole consists primarily in the production of methylol substituents on the benzene ring of the phenol. When initially produced, an A stage resole may be soluble in water or in certain organic solvents such as methanol and ethanol with or without the presence of some water. A stage resoles likewise are soluble in alkaline solutions. However, further reaction of the methylol groups results in polymerization to form a product that is insoluble in alkaline solutions and the reaction product in this condition is commonly referred to as being in the "B stage." Further polymerization under curing conditions utilizing elevated temperatures results in conversion of the resin to the final or "C stage." When in the A stage, the resin may be in different conditions of advancement. The less advanced condition is more readily soluble in water without the aid of alkali. Increased advancement while still in the A stage results in decreased solubility in water which may be counteracted by the use of alkali to preserve solubility. However, as aforesaid, when the resin passes over to the B stage, it becomes insoluble in alkaline solutions. So long as the resin has not been carried to the B stage wherein it becomes insoluble in alkaline solutions, the resin in the A or resole stage may be soluble in water or in aqueous or non-aqueous lower aliphatic alcohols such as methanol with or without the presence of an alkaline material. Such resoles are extensively made and sold, the precise formulations depending upon the use for which it is intended.

Resole solutions are widely used in the preparation of various types of laminates. In the production of such laminates, the resole solution or "varnish" is used for impregnating fibrous sheet material which may be made either from organic or mineral fibers. After partially or substantially completely drying, the impregnated sheet material is laminated and cured under heat and pressure. Most commercial A stage resole solutions contain from about 60% to 70% by weight of solids. However, for use as a laminating varnish, the resole solution usually is diluted to about 40% to 50% solids, depending upon the pick-up desired in saturating the fibrous sheet material. About 35% solids represents the minimum solids content for such solutions.

The dissolution of powdered free lignin in an A stage resole may be effected by adding the powdered lignin in increments, mixing with the resole solution being aided by agitation. The dissolution may be further accelerated by mild heating, e.g., to a temperature of the order of about 25° C. to about 40° C. When substantial quantities of lignin are added to the A stage resole, the increase in viscosity may be counteracted by the addition of a solvent such as methanol or a mixture of ethanol and water containing about 60 parts of ethanol and 40 parts of water, these solvents being commonly employed in commercial A stage resoles. While the free lignin dissolves quite readily in the A stage resole, nevertheless a separate blending operation of the character referred to is required for each batch that is used. Moreover, the operation involves the difficulties hereinabove mentioned due to the extreme dustiness of powered lignin as conventionally produced.

Heretofore free lignin has been considered insoluble not only in water but also in the solvents conventionally used in commercial A stage resole solutions such as the methanol and the ethanol-water solvents hereinabove mentioned. Thus when one attempts to add free lignin to methanol, for example, the lignin particles tend to form into a relatively firm, rubbery mass which does not go into solution with the methanol.

According to this invention, I have made the surprising discovery that if one keeps on adding free lignin to methanol even though the free lignin does not initially dissolve in the methanol, there eventually is reached a point at which all the free lignin goes into solution. This point is reached in the neighborhood of about 35% lignin, the percentage here and elsewhere being the percentage by weight of the combined weight of the lignin and solvent. There appears to be no upper limit to the amount of free lignin which may be dissolved inasmuch as at the high concentrations the free lignin is soluble, the only limitation on the amount of free lignin which may be added being imposed by the viscosity of the solution produced. By way of illustration, the viscosity at 30° C. of a 57.5% solution of free lignin in methanol is about 4350 centipoises. The viscosity may be reduced by heating. Thus when this solution was heated to 60° C. the viscosity was reduced to 300 centipoises. Usually the solution becomes excessively viscous for most purposes when the lignin concentration is greater than about 75%. The lignin concentration of preferred utility according to this invention ranges from about 45% to about 60%.

The phenomenon which occurs in producing this solution is reversible in that, if methanol is added to the high concentration solution of free lignin in methanol, the lignin starts to separate out when the solution is diluted below the aforesaid point at which the free lignin becomes soluble in the methanol. This solubility behavior of free lignin in the particular solvent media above mentioned is precisely contrary to normal solubility behavior of solids in liquid solvent media.

So far as I am aware, the aforesaid extraordinary solubility characteristics of free lignin disclosed herein have not previously been known and such high concentration solutions of free lignin constitute new products in the art.

In addition to 100% methanol, the aforesaid solubility phenomena of free lignin may also be obtained in the case of methanol-water mixtures, provided, however, that not more than about 10% by weight of water is present. When there is more than about 10% of water in admixture with the methanol, then the free lignin is not soluble.

In addition to methanol, corresponding solubility characteristics are exhibited by ethanol and ethanol-water mixtures containing not more than about 30% by weight of water. In the case of isopropanol, this alcohol by itself is not a solvent for free lignin in any proportions; but I have further found that the solubility characteristics hereinabove described are exhibited by isopropanol-water mixtures containing about 20% to about 35% by weight of water. However, in the case of these isopropanol-water mixtures the dissolution of the free lignin is aided by mild heating, which may vary somewhat depending upon the isopropanol:water ratio. Using each of these solvent media, the dissolution of the free lignin requires that the solution shall contain at least about 35% by weight of the free lignin. In addition to the solvent media above disclosed when considered individually, mixtures of these solvent media with each other may likewise be used.

The utility of this invention as well as a further feature thereof may be illustrated in connection with the usage of the high concentration free lignin solutions in the low molecular weight alcoholic solvent media hereinabove described in connection with the production of resole-lignin solutions suitable for use as a laminating varnish. Thus instead of supplying powdered free lignin for dissolution in an A stage resole for each batch of lignin-resole varnish which is to be prepared, the free lignin may be supplied in the form of a high solids concentration alcoholic solution and all that is required to produce the lignin-resole varnish wherein the free lignin and the A stage resole are in mutual solution is the mixing of the resole solution and the lignin solution in those proportions for obtaining the desired lignin:resole ratio in the lignin-resole varnish. Thus, instead of shipping the lignin in powdered form in individual containers, it may be shipped in bulk in tank cars filled with the concentrated lignin solution. It is immaterial which solution is added to the other. Such practice of this invention is illustrated by the following example:

*Example*

A 50% solution of free lignin was prepared by adding 50 parts by weight of free lignin slowly to 50 parts by weight of methanol with constant agitation. The resultant lignin-methanol solution was added to an A stage resole solution containing about 73% solids in the ratio of 50 parts by weight of the lignin-methanol solution to 50 parts of the A stage resole. The two solutions became readily mixed together to yield a final lignin-resole solution having a solids content of 61.5%. If, for use as a laminating varnish or the like, a lower solids content is desired, additional methanol may be added to the solution.

In addition to this particular A stage resole, any other A stage resole may be similarly employed. Moreover, instead of using methanol any of the other solvent media hereinabove described may be employed.

In connection with the foregoing, it may be noted that for initially producing the solution of free lignin advantage is taken of the extraordinary solubility characteristics of free lignin in the solvent media hereinabove disclosed when the free lignin is used in the high concentration zone wherein such solubility is obtained. When the high concentration solution is added to the A stage resole, the concentration of the lignin in the over-all solution drops below that at which solution is obtained in the absence of the resole, but the presence of the resole in the solution holds the free lignin in solution when the lignin-resole solution is prepared for uses such as a laminating varnish. In such case, the solids content of the solution is normally greater than about 40% by weight.

The practice of this invention is especially valuable in relation to the provision of solutions of free lignin in an A stage resole solution inasmuch as the solvent media generally employed in connection with varnishes for use in preparing the laminates are based on the use of lower aliphatic alcohols such as methanol and ethanol with or without the presence of a small amount of water. It has previously been known that acetone and certain mixtures of acetone with water or with methanol are capable of dissolving free lignin in all proportions of free lignin to the solvent. However, acetone is substantially more expensive than either ethanol or methanol and likewise presents problems due to its extreme volatility and its adverse effect on the bonding of fibers. For these and other reasons the use of substantial quantities of acetone in a laminating varnish is undesirable. It is apparent that the practice of this invention enables free lignin to be supplied in the form of a high solids concentrated solution in the very solvent media that desirably or preferably are employed in varnishes used for laminating purposes. Moreover, in the manufacture of A stage resoles for use as laminating varnishes it is common practice to distill part of the water off that is present during the resole-forming reaction and then thereafter add a solvent such as methanol or ethanol to provide the preferred solvent medium for effecting not only good shelf life but also desirable characteristics for effecting impregnation and drying of fabric sheets used with the laminating resin. By adding the lignin in the form of a high solids concentration solution in an alcoholic medium according to this invention, an adjustment of the alcohol content of the solution in the laminating varnish is automatically accomplished while at the same time adding the free lignin in the convenient dissolved state. This occurs whether or not the resole solution to which the solution of free lignin is added does or does not contain a low molecular weight alcohol in the solvent medium. The relative proportions of lignin and resole solution may be varied over a wide range so that the ratio of free lignin to the A stage resole in the mixture may range from about 1:10 to 5:1. Usually, in order to take full advantage of the economy and properties afforded by the use of free lignin, it is desirable that the ratio of free lignin to the A stage resole be at least 1:2. This reference is to the amount of free lignin that is added to the A stage resole to form a mutual solution therewith inasmuch as the free lignin when added is regarded as having reactivity with the alkaline catalyst contained in the resole as described more fully in our aforesaid copending application.

While this invention has been described in connection with certain ways for effecting the practice thereof, it is to be understood that this has been done for the purposes of illustration and that the practice of this invention may be varied within the scope of the principles employed in the practice thereof as hereinabove set forth.

I claim:
1. The method of dissolving free alkali lignin in its entirety in a liquid solvent selected from the group consisting of methanol, methanol-water containing not more than 10% by weight of water, ethanol, ethanol-water containing not more than 30% by weight of water and isopropanol-water containing from about 20 to 35% by weight of water where said lignin is only partially soluble in said solvent at solids concentrations of less than 35% which comprises adding to said solvent a quantity of said lignin in excess of 35 parts by weight per 65 parts by weight of said solvent.
2. A solution prepared by the method of claim 1 having a solids content above 35% by weight.
3. The solution of claim 2 wherein the solids content is between 45 and 55%.

References Cited by the Examiner

UNITED STATES PATENTS

| | | | |
|---|---|---|---|
| 2,282,518 | 5/42 | Hochwalt et al. | 260—17.5 XR |
| 2,683,706 | 7/54 | Muller | 260—17.5 XR |
| 2,703,293 | 3/55 | Boehm et al. | 106—123 XR |

OTHER REFERENCES

Brauns: The Chemistry of Lignin, Academic Press Inc., New York, N.Y., 1952, pp. 453–457 relied upon, and pp. 98 and 104.

WILLIAM H. SHORT, *Primary Examiner.*

ALLEN M. BOETTCHER, MILTON STERMAN,
*Examiners.*